United States Patent [19]

Shiraki et al.

[11] Patent Number: 5,290,498
[45] Date of Patent: Mar. 1, 1994

[54] ULTRA-HIGH MOLECULAR WEIGHT POLYETHYLENE THIN-WALL PIPE, AND METHOD OF AND APPARATUS FOR MANUFACTURING THE SAME

[75] Inventors: Takeshi Shiraki; Iwatosi Suzuki; Kunie Hiroshige, all of Kuga, Japan

[73] Assignee: Mitsui Petrochemical Industries, Ltd., Tokyo, Japan

[21] Appl. No.: 862,958

[22] Filed: Apr. 3, 1992

[30] Foreign Application Priority Data

Apr. 3, 1991 [JP] Japan .................................. 3-71055
Apr. 12, 1991 [JP] Japan .................................. 3-79683
Jun. 4, 1991 [JP] Japan .................................. 3-132624

[51] Int. Cl.$^5$ .............................................. B29C 47/24
[52] U.S. Cl. ........................... 264/209.2; 264/565; 264/209.5; 264/209.8; 264/211.21; 264/312; 264/331.17; 425/325; 425/381; 425/466
[58] Field of Search ............ 264/209.8, 209.1–209.5, 264/565–569, 331.17, 312, 211.21; 425/326.1, 325, 381, 466, 467, 380

[56] References Cited

U.S. PATENT DOCUMENTS

| | | | |
|---|---|---|---|
| 3,244,781 | 4/1966 | Covington, Jr. et al. | 264/209.2 |
| 3,387,331 | 6/1968 | Billings | 264/209.2 |
| 3,891,374 | 6/1975 | Ninomiya | 264/569 |
| 4,165,354 | 8/1979 | Iida | 264/209.1 |
| 4,938,908 | 7/1990 | Shiraki et al. | 264/209.2 |
| 4,946,371 | 8/1990 | Shiraki et al. | 264/209.2 |
| 4,987,025 | 8/1991 | Shiraki . | |
| 5,063,016 | 11/1991 | Bauer et al. | 264/211.21 |

FOREIGN PATENT DOCUMENTS

| | | |
|---|---|---|
| 348777 | 11/1988 | Austria . |
| 0213807 | 11/1987 | European Pat. Off. . |
| 0231637 | 12/1987 | European Pat. Off. . |
| 2357078 | 5/1975 | Fed. Rep. of Germany . |
| 2252202 | 6/1975 | France . |
| 49-18788 | 5/1974 | Japan .................. 264/565 |
| 231270 | 12/1985 | Japan . |
| 62-104911 | 5/1987 | Japan .................. 264/209.2 |
| 63-5256 | 2/1988 | Japan .................. 264/209.1 |

*Primary Examiner*—Jeffery Thurlow
*Attorney, Agent, or Firm*—Sherman and Shalloway

[57] ABSTRACT

A method of manufacture of an ultra-high molecular weight polyethylene thin-wall pipe which is uniform in thickness and free from a folded mark. The ultra-high molecular weight polyethylene thin-wall pipe is manufactured by supplying ultra-high molecular weight polyethylene into and melting and kneading, continuously extruding the molten substance of the ultra-high molecular weight polyethylene from a die connected to a screw of the screw extruder to form a cylindrical roughly shaped article, and diametrically expanding the cylindrical roughly extruded article by means of a tapered core and taking up.

4 Claims, 3 Drawing Sheets

ULTRA-HIGH MOLECULAR WEIGHT POLYETHYLENE THIN-WALL PIPE, AND METHOD OF AND APPARATUS FOR MANUFACTURING THE SAME

FIELD OF THE INVENTION

This invention relates to an ultra-high molecular weight polyethylene thin-wall pipe and a method of and an apparatus for manufacturing the same. More particularly, the present invention relates to a thin-wall pipe such as a shrinkage pipe, a pipe or a film made of ultra-high molecular weight polyethylene and a method of and an apparatus for manufacturing the same.

Specifically, the present invention relates to an ultra-high molecular weight polyethylene shrink pipe which can be employed suitably as a shrink pipe for covering various roles, pipes and steel tubes for its advantages that, since, comparing with a shrink pipe obtained by a conventional blown film extrusion method, it is so thick that it can be finished by a lathe or the like and besides it is low in coefficient of shrinkage in a longitudinal direction, it is superior in covering efficiency and is effective to obtain an effective covering and also superior in durability, and also to a method of and an apparatus for manufacturing such ultra-high molecular weight polyethylene shrink pipe efficiently.

In addition, the present invention relates to a method and an apparatus by which an ultra-high molecular weight polyethylene film suitable for an application which needs dimensional stability because, comparing with a film obtained by a conventional blown film extrusion method, it is uniform in thickness and has no folded mark at both ear edges thereof can be obtained.

Further, the present invention relates to an ultra-high molecular weight polyethylene thin-wall pipe wherein the ratio of an outer diameter to a thickness is higher than 10 and the coefficient of thermal shrinkage is low and to a method by which an ultra-high molecular weight polyethylene thin-wall pipe of a required thickness can be manufactured readily in accordance with an application of the same as well as to a manufacturing apparatus which can be used suitably for the method.

BACKGROUND OF THE INVENTION

Ultra-high molecular weight polyethylene is superior in abrasion resistance, self-lubrication, chemical resistance and so forth, and is applied to various applications making use of the characteristics.

By the way, it is a conventional practice, in order to cover an outer peripheral face of a roll, a pipe, a steel tube or the like to provide weathering resistance, a chemical resistance, a durability and so forth, to cover the outer peripheral face of such roll, pipe, steel tube or the like with a pipe, a film or the like. In this instance, it is a conventional practice to insert such roll, pipe, steel tube or the like into a shrink pipe or film and then make the shrink pipe or film to shrink and cover them over the roll, pipe, steel tube or the like. In such a case, shrink pipes or films made of TEFLON ® are conventionally used However, TEFLON ® is inferior in abrasion resistance. For example, TEFLON ® has a sand abrasion loss as high as five times that of ultra-high molecular weight polyethylene.

Thus, a shrink pipe or film made of ultra-high molecular weight polyethylene has been proposed, and a method of manufacturing a shrink tube or film made of ultra-high molecular weight polyethylene, for example, by a method which has been proposed and disclosed in Japanese Patent Laid-Open Application No. 62(1987)-122736.

However, according to the method disclosed in Japanese Patent Laid-Open Application No. 62(1987)-122736, a shrink tube or film during manufacture must necessarily be sealed to exclude internal air, therefor it is folded into a flattened outer profile by means of pinch rolls. Consequently, an ultra high molecular weight polyethylene shrink pipe or film obtained has folded marks at both ear edges thereof, and if the shrink tube or film is caused to shrink to cover a roll or the like, then such folded marks will remain in the shrink tube or film. Therefore, the method cannot be adopted readily for an application for which a high degree of accuracy is required. Further, since a shrink tube obtained by the method has a thickness equal to or less than 1 mm, it is difficult to finish it by lathe machining. Besides, since such product is biaxially oriented, it is also disadvantageous in that shrinkage in a longitudinal direction is great.

It is another conventional practice that, in order to cover an outer peripheral face of a roll, a pipe, a steel tube or the like to provide a weathering resistance, a chemical resistance, a durability and so forth, an ultra-high molecular weight polyethylene thin-wall pipe is heated to 100° to 130° C. to expand the diameter thereof by thermal expansion and then the roll, pipe, steel tube or the like is inserted into the ultra-high molecular weight polyethylene thin pipe of the expanded diameter, whereafter the thin pipe is cooled to shrink to cover the roll, pipe, steel tube or the like.

Manufacture of the ultra-high molecular weight polyethylene thin-wall pipe is conventionally made by a method of compression molding or another method of mechanically machining a rod of ultra-high molecular weight polyethylene. However, a thin-wall pipe of an indefinite length cannot be obtained by those methods, and besides a high cost is required and it is difficult to manufacture such thin wall pipe economically.

Thus, a method of manufacturing a flexible tube made of ultra-high molecular weight polyethylene has been proposed and is disclosed in Japanese Patent Publication Application No. 2(1990)-31270 wherein ultra-high molecular weight polyethylene is melted by a screw extruder and extrusion molded from a tube die by an L/D:5 wherein a mandrel is rotated by rotation of a screw.

According to the method disclosed in Japanese Patent Publication Application No. 2(1990)-31270, flexible tubes of comparatively small diameter equal to or less then 20 mm and of comparatively thickness with a ratio of the outer diameter to the thickness equal to or less than 15 can be obtained. But the method involves draw forming, so it has drawbacks that a pipe with an inner diameter greater than an outer diameter of a mandrel used cannot be obtained and that a pipe obtained gets to expand in diameter when it is heated. Further, with the method, since an outer diameter is restricted by a sizer, it is difficult to obtain an inner surface with excellent smoothness. Consequently, it is difficult to efficiently manufacture a thin-wall pipe having a low coefficient of thermal shrinkage and having an inner surface with excellent smoothness.

SUMMARY OF THE INVENTION

It is a first object of the present invention to provide an ultra-high molecular weight polyethylene thin-wall pipe which, comparing with an ultra-high molecular weight polyethylene shaped article obtained by a conventional blown film extrusion method, is uniform in thickness and free from a folded mark and can achieve, when it is used to cover a roll, a pipe, a steel tube or the like, a covering with a high degree of accuracy in dimension.

It is a second object of the present invention to provide a method by which such ultra-high molecular weight polyethylene shaped article can be manufactured at a high efficiency.

It is a third object of the present invention to provide an apparatus which can be used suitably for such manufacturing method for an ultra-high molecular weight polyethylene shaped article.

It is a fourth object of the present invention to provide an ultra-high molecular weight polyethylene shrink pipe which can be employed suitably as a covering shrink pipe for various roles, pipes and steel tubes for its advantages that, since, comparing with a shrink pipe obtained by a conventional blown film extrusion method, it is so thick that it can be finished by a lathe or the like and besides it is low in coefficient of shrinkage in a longitudinal direction, it is superior in covering efficiency and is effective to obtain an effective covering and also superior in durability.

It is a fifth object of the present invention to provide a method by which such ultra-high molecular weight polyethylene shrink pipe can be manufactured at a high efficiency.

It is a sixth object of the present invention to provide an apparatus which can be used suitably for such manufacturing method for an ultra-high molecular weight polyethylene shrink pipe.

It is a seventh object of the present invention to provide a method by which an ultra-high molecular weight polyethylene film which can be applied suitably for an application for which a high degree of accuracy in dimension is required since it is uniform in thickness and has no folded mark at both ear edges thereof, comparing with a film obtained by a conventional blown film extrusion method can be obtained.

It is an eighth object of the present invention to manufacture an apparatus which can be used suitably for such manufacturing method for an ultra-high molecular weight polyethylene film.

It is a ninth object of the present invention to provide an ultra high molecular weight polyethylene thin wall pipe wherein the ratio of an outer diameter to a thickness is equal to or higher than 10 and the coefficient of thermal shrink is low and besides the average roughness of an inner surface is low.

It is a tenth object of the present invention to provide a method by which such ultra-high molecular weight polyethylene thin wall pipe of a required thickness can be manufactured readily in accordance with an application thereof.

It is an eleventh object of the present invention to provide a manufacturing apparatus which can be used suitably for the manufacturing method for an ultra-high molecular weight polyethylene thin-wall pipe.

In order to attain the first object, according to the present invention, there is provided an ultra-high molecular weight polyethylene pipe-shaped article made of ultra-high molecular weight polyethylene having an intrinsic viscosity ($\eta$) of 5.0 dl/g or more, the pipe-shaped article being uniform in thickness and free from a folded mark.

In order to attain the second object, according to the present invention, there is provided a method of manufacturing an ultra-high molecular weight polyethylene pipe-shaped article, comprising the steps of:

supplying ultra-high molecular weight polyethylene having an intrinsic viscosity ($\eta$) of 5.0 dl/g or more into a screw extruder, and melting and kneading the ultra-high molecular weight polyethylene in the screw extruder.

The molten substance of the ultra-high molecular weight polyethylene is continuously extruded from a die having an L/D ratio at least 10, which includes an inner die connected to and rotated together with the screw of the extruder, disposed therein, and forms into a roughly cylindrical shape; and diametrically expanding the cylindrical rough extruded article by means of a tapered core connected to the inner die, which includes a tapered portion and a cylindrical portion continuously followed after the tapered portion, and causing the ultra-high molecular weight polyethylene to start to be cooled to cure at the tapered core.

In order to attain the third object, according to the present invention, there is provided an apparatus for manufacturing an ultra-high molecular weight polyethylene thin-wall pipe, comprising:

an extruder including a grooved cylinder and a screw inserted in the grooved cylinder and having a compression ratio of 1 to 2.5;

a die having an L/D ratio at least 10, including an inner die connected to an end of the screw of the screw extruder and rotate together with the rotation of the screw and an outer die connected to the grooved cylinder; and a tapered core including a shaft connected to an end of the inner die and rotated together with rotation of the inner die, a tapered portion not rotating together with the shaft and having an increasing diameter in a downstream direction such that a maximum outer diameter thereof is at least larger than a diameter of the inner die, and a cylindrical portion provided continuously to the tapered portion.

In order to attain the fourth object, according to the present invention, there is provided an ultra-high molecular weight polyethylene shrink pipe made of ultra-high molecular weight polyethylene having an intrinsic viscosity ($\eta$) of 5.0 dl/g or more, having an outer diameter (D1) of 10 mm or more and a thickness (t1) of 0.2 mm or more with a ratio of the outer diameter to the thickness (D1/t1) 10 or higher, and having a coefficient of shrinkage of 20% or more in a diametrical direction at 140° C.

In order to attain the fifth object, according to the present invention, there is provided a method of manufacturing an ultra-high molecular weight polyethylene shrink pipe, comprising the steps of:

supplying ultra-high molecular weight polyethylene having an intrinsic viscosity ($\eta$) of 5.0 dl/g or more into a screw extruder, and melting and kneading the ultra-high molecular weight polyethylene;

continuously extruding the molten substance of the ultra-high molecular weight polyethylene from a die having an L/D ratio at least 10, wherein an inner die connected to and rotated together with rotation of the screw of the screw extruder, is disposed to form the extruded article into a roughly cylindrical rough shape; and diametrically expanding the roughly cylindrical extruded article by means of a tapered core connected to the inner die such that the outer diameter of a maximum diametrically expanding portion may be 1.2 to 3.0 times of the outer diameter of the inner die, and taking up the extruded article at a taking up rate five times or lower than the extruding rate at the screw extruder, and causing the ultra-high molecular weight polyethylene to start to be cooled to cure at a tapered portion of the tapered core.

In order to attain the sixth object, according to the present invention, there is provided an apparatus for manufacturing an ultra-high molecular weight polyethylene shrink pipe, comprising:

an extruder including a grooved cylinder, and a screw inserted in the grooved cylinder and having a compression ratio of 1 to 2.5;

a die having an L/D ratio at least 10, including an inner die connected to an end of the screw and rotated together with rotation of the screw, and an outer die connected to the grooved cylinder; and a tapered core including a shaft connected to an end of the inner die and rotated together with rotation of the inner die, and a tapered forming number not rotating together with the shaft and having an increasing diameter in a downstream direction such that a maximum outer diameter thereof is at least 1.2 to 3.0 times the diameter of the inner die.

In order to attain the seventh object, according to the present invention, there is provided a method of manufacturing an ultra-high molecular weight polyethylene film, comprising the steps of:

supplying ultra-high molecular weight polyethylene having an intrinsic viscosity ($\eta$) of 5.0 dl/g or more into a screw extruder, and melting and kneading the ultra-high molecular weight polyethylene;

continuously extruding the molten substance of the ultra-high molecular weight polyethylene from a die having an L/D ratio at least 10, wherein an inner die connected to and rotated together with rotation of the screw of the screw extruder is disposed in the inside of an outer die, to form a extruded article into cylindrical roughly shape; and diametrically expanding the roughly cylindrical extruded articles by means of a tapered core connected to the inner die such that the outer diameter of a maximum diametrically expanding portion may be 3 or more times of the outer diameter of the inner die, and taking up the extruded article at a taking up rate three times or higher than the extruding rate of the molten substance of the ultra-high molecular weight polyethylene at the screw extruder.

In order to attain the eighth object, according to the present invention, there is provided an apparatus for manufacturing an ultra-high molecular weight polyethylene film, comprising:

an extruder including a grooved cylinder, and a screw inserted in the grooved cylinder and having a compression ratio of 1 to 2.5;

a die having an L/D ratio at least 10, including an inner die connected to an end of the screw of the screw extruder and rotated together with rotation of the screw and an outer die connected to the grooved cylinder; and a tapered core including a shaft connected to an end of the inner die and rotated together with rotation of the inner die, and a tapered forming member not rotating together with the shaft and having an increasing diameter at an angle of 5 to 50 degrees in a downstream direction such that a maximum outer diameter thereof is at least equal to or higher than 3 times the diameter of the inner die; and a take-up unit including rolls having a width of 50 to 80% of a folded width of an ultra-high molecular weight polyethylene film formed by the tapered core.

In order to attain the ninth object, according to the present invention, there is provided an ultra-high molecular weight polyethylene thin-wall pipe made of ultra-high molecular weight polyethylene having an intrinsic viscosity ($\eta$) of 5.0 dl/g or more and having an outer diameter (D2) 10 mm or more and a thickness (t2) 0.5 mm or more with a ratio of the outer diameter to the thickness (D2/t2) 10 or higher, and having a coefficient of shrinkage of 5% or less in a diametrical direction at 100° C.

In order to attain the tenth object, according to the present invention, there is provided a method of manufacturing an ultra-high molecular weight polyethylene thin-wall pipe, comprising the steps of:

supplying ultra-high molecular weight polyethylene having an intrinsic viscosity ($\eta$) of 5.0 dl/g or more into a screw extruder, and melting and kneading the ultra-high molecular weight polyethylene;

continuously extruding the molten substance of the ultra high molecular weight polyethylene from a die having an L/D ratio at least 10, including an inner die connected to and rotated together with the screw of the screw extruder, disposed therein, to form a roughly cylindrical extruded articles; and diametrically expanding the roughly cylindrical extruded articles by means of a tapered core connected to the inner die, including a tapered portion and a cylindrical portion provided continuously to the tapered portion, such that the outer diameter of a maximum diametrically expanding portion may be 1.2 to 3.0 times of the outer diameter of the inner die, taking up the roughly cylindrical extruded article at a taking up rate three times or lower than the extruding rate of the ultra-high molecular weight polyethylene at the screw extruder, and causing the ultra high molecular weight polyethylene to start to be cooled to cure at the cylindrical portion of the tapered core.

In order to attain the eleventh object, according to the present invention, there is provided an apparatus for manufacturing an ultra-high molecular weight polyethylene thin-wall pipe, comprising:

an extruder including a grooved cylinder, and a screw inserted in the grooved cylinder and having a compression ratio of 1 to 2.5;

a die having an L/D ratio at least 10 including an inner die connected to an end of the screw of the screw extruder and rotated together with rotation of the screw and an outer die connected to the grooved cylinder; and a tapered core including a shaft connected to an end of the inner die and rotated together with rotation of the inner die, a tapered forming member not rotating together with the shaft and having an increasing diameter at an angle of 5 to 50 degrees in a downstream direction such that a maximum outer diameter thereof is at least 1.2 to 3.0 times of the diameter of the inner die, and a cylindrical portion provided continuously to the tapered portion with a heat insulating material interposed therebetween.

BRIEF DESCRIPTION OF THE DRAWINGS

The accompanying drawings which are incorporated in and constitute a part of this specification, illustrate embodiments of the invention, and together with the description, serve to explain the principle of the invention.

DETAILED DESCRIPTION OF THE DISCLOSURE

Figure 1:
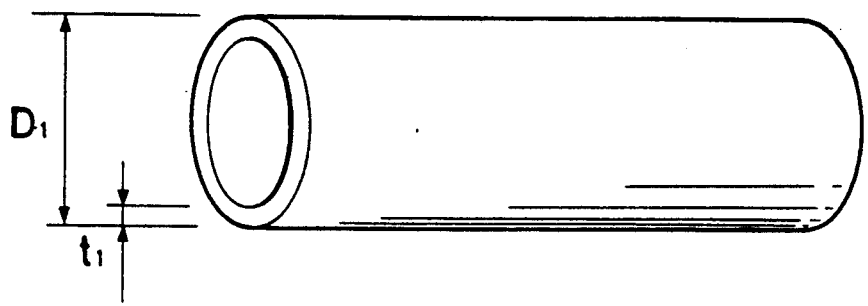
FIG. 1 is a schematic view illustrating an ultra-high molecular weight polyethylene shrink pipe which is an embodiment of an ultra-high molecular weight polyethylene thin-wall pipe of the present invention.

The preferred embodiments of the present invention will be described in detail below.

Ultra-high molecular weight polyethylene which is a raw material for an ultra-high molecular weight polyethylene thin-wall pipe of the present invention consists mainly of ethylene and may be, for example, homopolymer of ethylene or copolymer which consists of ethylene as a main component and monomer copolymerizable with ethylene. The monomer copolymerizable with ethylene may be, for example, α-olefin having a carbon number of 3 or more Such α-olefin having a carbon number of 3 or more may be, for example, propylene, 1-butene, isobutene, 1-pentene, 2-methyl-1-butene, 3-methyl-1-butene, 1-hexene, 3-methyl-1-pentene, 4-methyl-1-pentene, 1-heptene, 1-octene, 1-decene, 1-dodecene, 1-tetradecene, 1-hexadecene, 1-octadecene or 1-icocene.

Such ultra-high molecular weight polyethylene should have an intrinsic viscosity ($\eta$) 5.0 dl/,g or higher and preferably have an intrinsic viscosity ($\eta$) of 8 to 30 dl/g so that molten substance thereof may not cause, upon molding, difference in wall thickness by twist of molten substance thereof by turning motion thereof together with an inner die which will be hereinafter described or by distortion of the inner die, and consequently, a thin-wall pipe having a uniform thickness can be obtained.

If necessary, various stabilizing agents may be mixed into the ultra high molecular weight polyethylene. The stabilizing agents may be, for example, heat stabilizer such as tetrakis [methylene (3, 5-di-t-butyl-4-hydroxy) hydrocinnamate] methane, distearylthiodipropionate and so forth, weathering agents such as bis (2, 2', 6, 6'-tetramethyl-4-piperidine) sebacate, 2-(2-hydroxy-t-butyl-5-methylphenyl)-5-chlorobenzotriazole and so forth, and so forth. Further, an inorganic or organic dry color may be added as a coloring agent.

An ultra-high molecular weight polyethylene thin-wall pipe of the present invention is uniform in thickness and free from a folded mark.

The ultra-high molecular weight polyethylene thin-wall pipe may assume various concrete embodiment such as an ultra-high molecular weight polyethylene shrink pipe, an ultra-high molecular weight polyethylene film, an ultra-high molecular weight polyethylene thin-wall pipe and so forth.

A method of and an apparatus for manufacturing such ultra-high molecular weight polyethylene thin-wall pipe are generally constituted such that ultra-high molecular weight polyethylene having an intrinsic viscosity of 5.0 dl/g or more is supplied into, and molten and kneaded, and then the molten substance of the ultra-high molecular weight polyethylene is continuously extruded from a die having a L/D ratio thereof of at least 10, wherein an inner die connected to and rotated with a screw of the screw extruder is disposed in the inside thereof, to form a roughly cylindrical shape. The roughly cylindrical extruded article is diametrically expanded by a tapered core connected to the inner die, which includes a tapered portion and a cylindrical portion provided continuously to the tapered portion, and taken up by a take-up unit, the ultra-high molecular weight polyethylene starts to be cooled to solidify at the tapered core and then is cooled sufficiently by a cooling apparatus to obtain a desired thin-wall pipe.

In the following, the present invention will be described first by way of an example of an ultra-high molecular weight polyethylene shrink pipe as a concrete form of an ultra-high molecular weight polyethylene thin-wall pipe.

An ultra-high molecular weight polyethylene shrink pipe of the present invention has an outer diameter (D1) of 10 mm or more as shown in FIG. 1. When the outer diameter (D1) is small, a shaft for a tapered core is so thin accordingly that it cannot be connected readily to an inner die, but on the contrary when the outer diameter (D1) is large, there is the possibility that the cost of equipment is very high, which is economically disadvantageous. Accordingly, a preferable outer diameter ranges from 5 to 150 mm. Further, the thickness (t1) should be 0.2 mm or more, and particularly the ultra high molecular weight polyethylene shrink pipe is used for the covering of a roll, the thickness (t1) should preferably be 0.5 to 3 mm since machining a surface of the ultra-high molecular weight polyethylene shrink pipe can be performed by a lathe at a following step. In addition, the ratio of the outer diameter to the thickness (D1/t1) should be 10 or higher and preferably from 15 to 150 in view of economy.

An ultra-high molecular weight polyethylene shrink pipe of the present invention has a coefficient of shrinkage of 20 % at 140° C. in a diametrical direction, and when the shrink pipe is to be used as a covering member, the coefficient of shrinkage in a diametrical direction at 140° C. is preferably from 40 to 150% in order to assure a high covering strength against a core member to be coated with the shrink pipe.

Such ultra-high molecular weight polyethylene shrink pipe can be manufactured by a method comprising the steps that ultra-high molecular weight polyethylene having an intrinsic viscosity of 5.0 dl/g or more is supplied into, and molten and kneaded, and then the molten substance of the ultra-high molecular weight polyethylene is continuously extruded from a die having a L/D ratio of at least 10, wherein an inner die connected to and rotated with a screw of the screw extruder is disposed in the inside thereof, to form a roughly cylindrical shape, and after then, the roughly cylindrical extruded article is taken up at a taking up rate equal to or less than five times of the extruding rate of the ultra-high molecular weight polyethylene by the screw extruder, while the diameter thereof is expanded by a tapered core connected to the inner die such that the inner diameter of a maximum diametrically expanded portion thereof may be 1.2 to 3.0 times of the outer diameter of the inner die and the ultra-high molecular weight polyethylene starts to be cooled to solidify at a tapered portion of the tapered core.

Subsequently, the manufacturing method will be described in detail in connection with an embodiment of a manufacturing apparatus for an ultra-high molecular weight polyethylene shrink pipe of the present invention shown in FIGS. 2 to 4.

Figure 2:
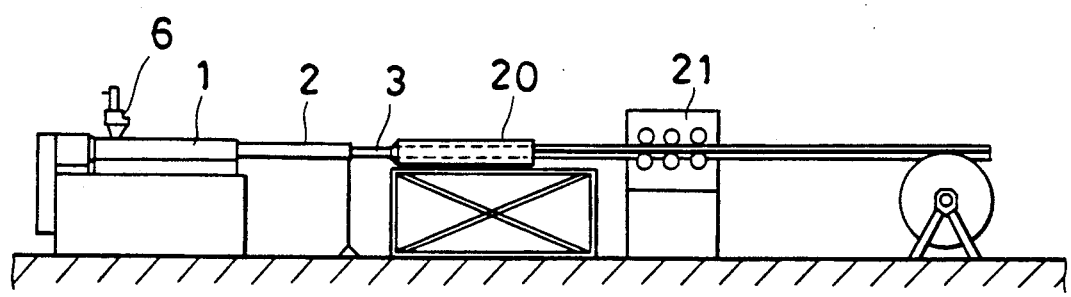
FIG. 2 is a schematic view illustrating principal steps of a method of manufacturing the ultra-high molecular weight polyethylene thin-wall pipe.

The manufacturing apparatus for an ultra-high molecular weight polyethylene shrink pipe shown in FIG. 2 includes as essential components a screw extruder 1, a die 2 mounted on the screw extruder 1, and a tapered core 3 provided continuously to the die 2.

Figure 3:
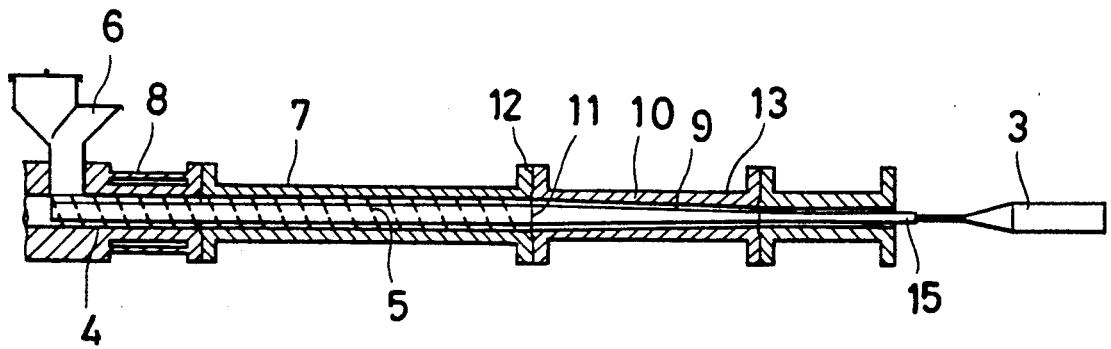
FIG. 3 is a schematic sectional view showing principal part of a manufacturing apparatus for the ultra-high molecular weight polyethylene shrink pipe.

The screw extruder 1 includes, as shown in FIG. 3, a grooved cylinder 4, a screw 5 inserted in the groove cylinder 4 and a hopper 6 for supplying ultra-high molecular weight polyethylene of raw material.

The inner diameter of the grooved cylinder 4 is selected suitably so that a shrink pipe of a desired outer diameter may be obtained. Meanwhile, the grooves of the grooved cylinder 4 are formed to extend linearly in a downstream direction and disposed by a number of 8 to 12 in an equidistantly spaced relationship in a circumferential direction such that the length (L/D) thereof ranges from 3 to 10 and preferably from 5 to 8. The shape of the grooves is preferably an angular shape or a semicircular shape so that they can reinforce a driving force for ultra-high molecular weight polyethylene in the extruder. Further, the screw 5 should have a compression ratio of 1 to 2, and preferably a compression ratio of 1.3 to 2.0. The effective length (L/D) of the screw 5 normally ranges from 20 to 28 or so. The length of a compressing portion of the screw 5 ranges from 25 to 80% or so of the effective length (L/D). Meanwhile, the screw flight pitch normally ranges from 0.4 to 0.8 or so. The speed of rotation of the screw 5 is normally 10 to 30 rpm or so. Further, the hopper 6 is preferably a two-stage hopper since it facilitates, when the raw material is powder, back flows of air in the cylinder 4 and can prevent occurrence of a failure in dropping of raw material which arises from a hopper bridge.

A heating barrel 7 is disposed on a circumferential wall of the screw extruder 1 in order to melt ultra-high molecular weight polyethylene supplied into the screw extruder 1, and a water cooling barrel 8 is disposed in order to regulate the heating temperature by the heating barrel 7. The heating temperature at the screw extruder 1 is normally adjusted to a temperature higher than a melting point of ultra-high molecular weight polyethylene but equal to or lower than 340° C. and preferably to a temperature from 160° to 330° C.

The die 2 mounted on the screw extruder 1 is constituted from an inner die 9 and an outer die 10 in which the inner die 9 is inserted. The inner die 9 is connected to an end 11 of the screw 5 of the screw extruder 1 and is rotated by rotation of the screw 5. Meanwhile, the outer die 10 is mounted at an end 12 of the heating barrel 7 of the screw extruder 1. The die 2 has an L/D ratio at least 10 and preferably from 20 to 50. Further, the inner die 9 is preferably constituted such that, since it is rotated by rotation of the screw 5, the outer diameter of the inner die is reduced in a tapering condition from the connecting portion thereof, and then has a fixed outer diameter at the other end portion from a mid portion thereof, and besides it is coated at a surface thereof with fluorocarbon resin in order to assure high smoothness thereof with ultra-high molecular weight polyethylene which circulates in the inner die 9. A heating barrel 13 is disposed on an outer circumferential wall of the die 2 for regulating the temperature of ultra-high molecular weight polyethylene which moves in the die 2. The heating temperature of the die 2 is normally adjusted to 160° to 250° C.

Figure 4:
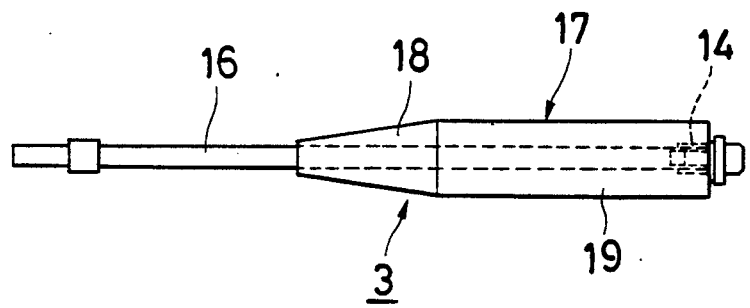
FIG. 4 is a schematic view illustrating a tapered core of the manufacturing apparatus for an ultra-high molecular weight polyethylene shrink pipe of the present invention.

In the manufacturing apparatus, the tapered core 3 shown in an enlarged view of FIG. 4 is provided continuously to the inner die 9. The tapered core 3 includes a shaft 16 connected to an end 15 of the inner die 9, and a tapered forming member 17 loosely fitted on the shaft 16. The shaft 16 connected to the end 15 of the inner die 9 is rotated together with the inner die 9 connected to the screw 5. The outer diameter of the shaft 16 is normally smaller than the outer diameter of the inner die 9, and the length of the shaft 16 is normally equal to 10 to 50 cm or so.

Meanwhile, the tapered forming member 17 is loosely fitted on the shaft 16 by means of a bearing 14 and is mounted on the shaft 16 such that it may not rotate together with the shaft 16 The tapered forming member 17 has a tapered portion 18 which is formed in an inclined relationship at an angle normally of 5 to 50 degrees and preferably of 10 to 30 degrees with respect to an axial direction of the shaft 16 so that frictional resistance upon diametrical expansion may be reduced to perform shaping readily. The tapered forming member 17 further has a cylindrical portion 19 provided continuously to the tapered portion 18.

A coating of fluorocarbon resin such as TEFLON (registered trade mark) is preferably applied to surfaces of the tapered portion 18 and the cylindrical portion 19 of the tapered forming member 17 so that the coefficient of friction with an ultra-high molecular weight polyethylene molded article may be reduced to perform molding smoothly.

The ratio in length of the tapered portion 18 to the cylindrical portion 19 of the tapered forming member 17 in its axial direction is normally set to 0.2 to 1 or so and preferably to 0.3 to 0.7 or so. Further, the outer diameter of the cylindrical portion 19 should be set at least to 1.2 to 3.0 times the diameter of the inner die 9 and preferably to 1.5 to 3.0 times and further preferably to 1.7 to 2.5 times the diameter of the inner die 9.

The method of the present invention proceeds on the manufacturing apparatus described above such that ultra-high molecular weight polyethylene having an intrinsic viscosity ($\eta$) of 5.0 dl/g or more is first supplied into, molten and kneaded in the screw extruder 1, and then the molten substance of the ultra high molecular weight polyethylene is continuously extruded from the die 2 to form a roughly cylindrical shape, whereafter the diameter of the roughly cylindrical extruded article is expanded by the tapered core 3 such that the inner diameter of a maximum diametrically expanded portion of the cylindrical roughly molded form may be 1.2 to 3.0 times of the outer diameter of the inner die 9 of the die 2 and preferably 1.2 to 3.0 times and further preferably 1.7 to 2.5 times of the diameter of the inner die 9 so that a good shrink pipe of an appropriate thickness can be obtained. The thus diametrically expanded shrink pipe is cooled in a cooling tank 20 and then taken up by a take-up unit 21. The taking up rate of the take-up unit 21 is set equal to or lower then 5 times the extruding rate of the ultra high molecular polyethylene by the screw extruder 1 and preferably lower than 3 times or less The take-up unit 21 may be, for example, of the roll type, caterpillar type or belt type.

Further, in the present method, it is preferable to adjust such that ultra-high molecular weight polyethylene begins to be cooled to solidify at the tapered portion 18 of the tapered core 3, and preferably at a portion of the tapered portion 18 at which the diameter is smaller than that at a mid portion of the tapered portion 18 so that an ultra-high molecular weight polyethylene shrink pipe having a high coefficient of shrinkage can be obtained. Such adjustment of beginning of cooling cure of an ultra-high molecular weight polyethylene shrinkage pipe can be performed by adjusting the extruding rate of the screw extruder 1, the position of the tapered core 3, the position of a blowing ring for cooling air or the like.

The ultra-high molecular weight polyethylene shrink pipe taken up by and formed on the take-up unit 21 is suitably cut by a cutting machine. The cutting machine may be an automatic cutting machine such as, for example, a shearing cutter of the round saw type or of the type using a blade.

While mainly the method of and the apparatus for manufacturing an ultra-high molecular weight polyethylene shrink pipe having a circular inner profile has been described so far, the ultra-high molecular weight polyethylene shrink pipe is not limited to that which has a circular inner profile, but may be made a pipe of an outer profile conforming to an application thereof by suitably selecting an outer profile of a tapered core to be used. For example, if the outer profile of the tapered core is an angular shape or an elliptic shape, then an ultra-high molecular weight polyethylene shrink pipe as a pipe of an outer shape having an inner profile corresponding to such angular or elliptic shape can be obtained.

The ultra-high molecular weight polyethylene shrink pipe of the present invention can be used to cover an outer profile of a tubular member by inserting the tubular member into the inside of the same and heating to cause the same to be shrunk with making use of the shrinking property of the same. For example, a tubular member such as a roll or a steel tube is inserted into the ultra high molecular weight polyethylene shrink pipe, and then the ultra-high molecular weight polyethylene shrink pipe is heated to 100° to 160° C. to cause the same to be shrunk to cover the tubular member. Heating for such covering can be performed by immersing the ultra high molecular weight polyethylene shrink pipe into heating fluid such as air or liquid, or by blowing hot air or flame to the ultra-high molecular weight polyethylene shrink pipe.

For such covering with the ultra-high molecular weight polyethylene shrink pipe, an outer surface of a tubular member such as a roll or a steel tube is preferably formed in advance as a rough surface so that a slide resistance between contacting faces of the shrink pipe and the tubular member may be improved.

Further, preferably an adhesive resin is interposed on an outer surface of a tubular member such as a roll or a steel tube before the shrink pipe is coated on the tubular member so that the adhesive strength at an interface between them may be improved remarkably. Such method can be performed by thermally fusion applying powder or a film of an adhesive resin in advance to an outer surface of the tubular member. The adhesive resin used may be, for example, ADDMER NE060 (Mitsui Petrochemical Industries, Ltd., trade name) or the like or a modified product of the same.

Subsequently, a method of and an apparatus for manufacturing an ultra-high molecular weight polyethylene film as another concrete embodiment of an ultra-high molecular weight polyethylene polyethylene thin-wall pipe of the present invention will be described with reference to FIGS. 5 to 7.

Figure 5:
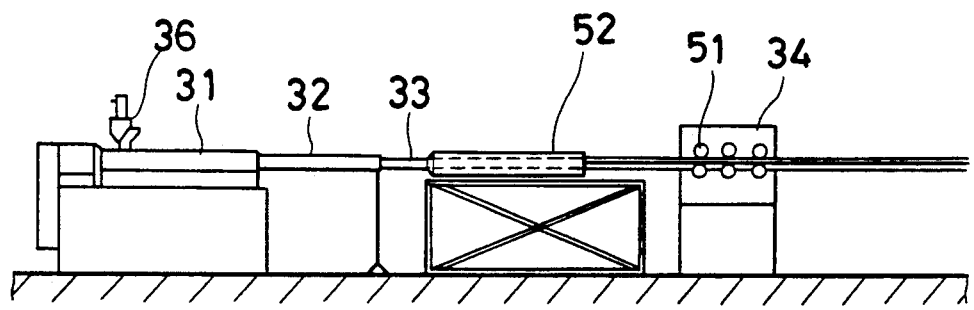
FIG. 5 is a schematic view illustrating principal steps of a method of manufacturing an ultra high molecular weight polyethylene film of the present invention.

The manufacturing apparatus for an ultra-high molecular weight polyethylene film shown in FIG. 5 includes as essential components a screw extruder 31, a die 32 mounted on the screw extruder 31, a tapered core member 33 provided continuously to the die 32, and a take-up unit 34.

Figure 6:
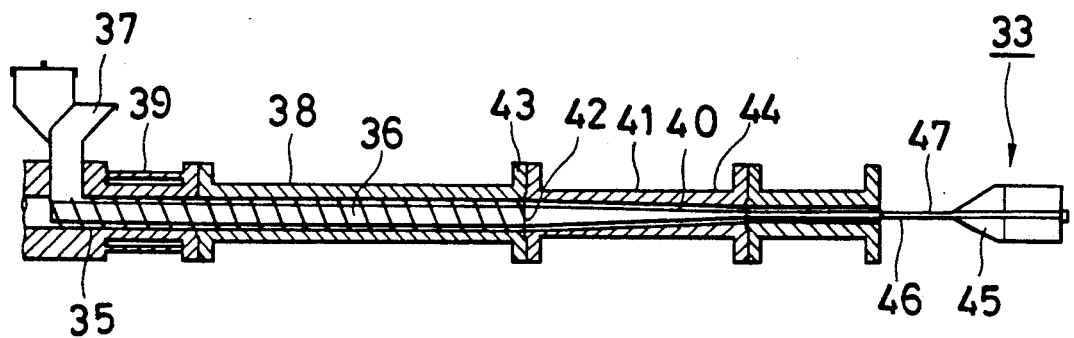
FIG. 6 is a schematic sectional view showing principal part of a manufacturing apparatus for an ultra-high molecular weight polyethylene film of the present invention.

The screw extruder 31 includes, as shown in FIG. 6, a grooved cylinder 35, a screw 36 inserted in the grooved cylinder 35 and a hopper 37 for supplying ultra-high molecular weight polyethylene of raw material.

The inner diameter of the grooved cylinder 35 is selected suitably so that a film of a desired outer diameter may be obtained The screw 36 should have a compression ratio of 1 to 2.5 and preferably a compression ratio of 1.3 to 2.0. The effective length (L/D) of the screw 36 normally ranges from 20 to 28 or so. The length of a compressing portion of the screw 36 ranges from 25 to 80% or so of the effective length (L/D). Meanwhile, the screw flight pitch normally ranges from 0.4 to 0.8 or so. The speed of rotation of the screw 36 is normally 10 to 50 rpm or so. Further, the hopper 37 is preferably a two-stage hopper since it facilitates, when raw material in the form of powder is to be handled, back flows of air in the cylinder 35 and can prevent occurrence of a failure in dropping of raw material which arises from a hopper bridge.

A heating barrel 38 is disposed on a circumferential wall of the screw extruder 31 in order to melt ultra-high molecular weight polyethylene supplied into the screw extruder 31, and a water cooling barrel 39 is disposed in order to regulate the heating temperature by the heating barrel 38. The heating temperature at the screw extruder 31 is adjusted normally to a temperature higher than a melting point of ultra-high molecular weight polyethylene but equal to or lower than 340° C. and preferably to a temperature from 160° to 330° C.

The die 32 mounted on the screw extruder 31 is constituted from an inner die 40 and an outer die 41 in which the inner die 40 is inserted The inner die 40 is connected to an end 42 of the screw 36 of the screw extruder 31 and is rotated by rotation of the screw 36. Meanwhile, the outer die 41 is mounted at an end 43 of the heating barrel 38 of the screw extruder 31. The die 32 has an L/D ratio at least 10 and preferably 20 to 50. Further, the inner die 40 is preferably constituted such that, since it is rotated by rotation of the screw 36, a diameter decreases in a tapering condition from the connecting portion thereof and then has a fixed outer diameter at the other end portion from a mid portion thereof, and besides it is coated at a surface thereof with fluorocarbon resin in order to assure a high slipping property thereof with resin. An electric heater 44 is disposed on an outer circumferential wall of the die 32 for regulating the temperature of molten substance of ultra-high molecular weight polyethylene which moves in the die 32. The heating temperature of the die 32 is normally adjusted to 160° to 250° C. or so.

Figure 7:
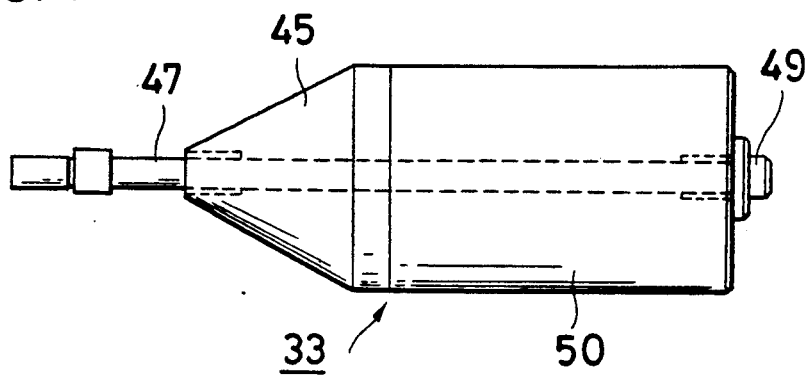
FIG. 7 is a schematic view illustrating a tapered core of the manufacturing apparatus for an ultra-high molecular weight polyethylene film of the present invention.

In the manufacturing apparatus, the tapered core member 33 shown in an enlarged view of FIG. 7 is provided continuously to the inner die 40 of the die 32. The tapered core member 33 is loosely fitted on a shaft 47 connected to an end 46 of the inner die 40. The shaft 47 connected to the end 46 of the inner die 40 is rotated together with the inner die 40 connected to the screw 36. The outer diameter of the shaft 47 is normally smaller than the outer diameter of the inner die 40, and the length of the shaft 47 is normally 10 to 50 cm or so.

Meanwhile, the tapered core member 33 is loosely fitted on the shaft 47 by means of a bearing 49 and is mounted on the shaft 47 such that it may not rotate together with the shaft 47.

The tapered core member 33 has a tapered portion 45 which is formed in an inclined relationship at an angle normally of 5 to 50 degrees and preferably of 10 to 30 degrees with respect to an axial direction of the shaft 47 so that frictional resistance between the tapered core member 33 and an ultra-high molecular weight polyethylene film upon diametrical expansion may be reduced to perform a shaping operation readily. The tapered core member 33 further has a cylindrical portion 50 provided continuously to the tapered portion 45.

A coating of fluorocarbon resin such as TEFLON ® is preferably applied to surfaces of the tapered portion 45 and the cylindrical portion 50 of the tapered core member 33 so that the coefficient of friction with an ultra-high molecular weight polyethylene molded article may be reduced to perform molding smoothly.

The ratio in length of the tapered portion 45 to the cylindrical portion 50 of the tapered core member 33 in its axial direction is normally set to 0.2 to 2 or so and preferably to 0.5 to 1.0 or so. Further, the maximum outer diameter of the tapered portion 45, that is, the outer diameter of the cylindrical portion 50, should be set at least to 3.0 times or more than the diameter of the inner die 40 and preferably to 4 times or more and further preferably to 5 to 7 times of the diameter of the inner die 40.

The manufacturing apparatus includes the take-up unit 34 as shown in FIG. 5. The take-up unit 34 includes 2 to 4 pairs, preferably 4 pairs, of rolls 51 disposed serially in a taking off direction of an ultra-high molecular weight polyethylene film. The rolls 51 preferably have a width of 50 to 80%, preferably of 70 to 80%, of a folding width of an ultra-high molecular weight polyethylene film shaped by the tapered core member 33 so that a sufficient taking up force may be obtained and a film which is uniform without having a wrinkle and has no folded mark at both ear edges thereof may be obtained.

In the manufacturing apparatus described above, ultra-high molecular weight polyethylene having an intrinsic viscosity ($\eta$) of 5.0 dl/g or more is first supplied into, molten and kneaded in the screw extruder 31, and then the molten substance of the ultra-high molecular weight polyethylene is continuously extruded from the die 32 to form a roughly cylindrical shape, whereafter the diameter of the roughly cylindrical extruded articles is expanded by the tapered core member 33 such that the inner diameter of a maximum diametrically expanded portion of the roughly cylindrical extruded articles may be 3 times or more than the outer diameter of the inner die 40 of the die 32 and preferably 4 times or more and further preferably 5 times or more than the diameter of the inner die 40 so that a good film of an appropriate thickness can be obtained. In this instance, in case the maximum outer diameter of the tapered portion 45, that is, the outer diameter of the cylindrical portion 50, is set to 5 times or more than the diameter of the inner die 40, a small hole may be formed at a location of the connecting portion at which the shaft 47 is connected to the end 46 of the inner die 40 so that compressed air may be blown in through the small hole to promote the diameter expanding operation.

The thus diametrically expanded film is cooled in a cooling tank 52 and then taken up by the take-up unit 34. The taking off rate of the take-up unit 34 is adjusted equal to or higher than 3 times and preferably to 3 to 20 times the extruding rate of the molten substance of the ultra-high molecular weight polyethylene by the screw extruder 31.

The ultra-high molecular weight polyethylene film of the present invention taken up by and formed on the take-up unit 34 is obtained in the form of a tube The ultra-high molecular weight polyethylene film in the form of a tube may be used as a film in the form of a tube as it is or may be cut at a portion thereof by a cutting machine and developed so that it may be used as a biaxially oriented film which has a great width and is free from a folded mark. The cutting machine may be a popular cutting machine such as, for example, a cutter blade. Or else, a biaxially oriented film obtained may be divided into belts or tapes elongated in a direction of a flow so that they may be used as base paper for stretchable tapes.

Subsequently, a method of and an apparatus for manufacturing an ultra-high molecular weight polyethylene thin-wall pipe as a further concrete embodiment of an ultra-high molecular weight polyethylene thin-wall pipe of the present invention will be described with reference to FIGS. 8 to 10.

Figure 8:
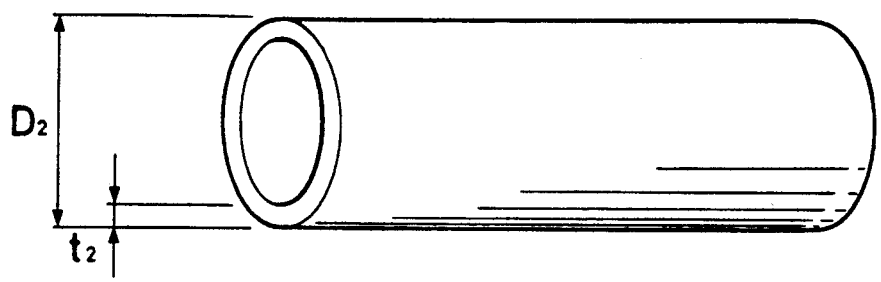
FIG. 8 is a schematic view showing an ultra-high molecular weight polyethylene thin-wall pipe of the present invention.
Figure 9:
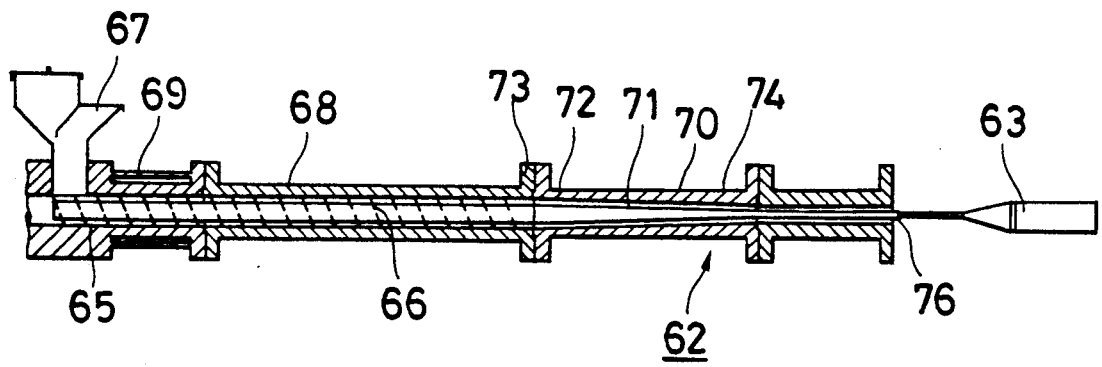
FIG. 9 is a schematic sectional view showing principal part of a manufacturing apparatus for an ultra-high molecular weight polyethylene thin-wall pipe of the present invention.

An ultra-high molecular weight polyethylene thin-wall pipe of the present invention has an outer diameter (D2) of 10 mm or more as shown in FIG. 8, and has a thickness (t2) of 0.5 mm or more, and in a range within which it can be shaped economically at a high productivity, preferably the outer diameter (D2) ranges from 25 to 100 mm and the thickness (t2) ranges from 1 to 5 mm. Further, the ratio of the outer diameter to the thickness (D2/t2) should be 10 or higher and preferably 15 to 50 so that a pipe having a high rigidity may be obtained. Further, the surface roughness of an inner face of the pipe in an extruding direction is equal to or less than 1.0 in average roughness and equal to or less than 5 in maximum roughness (Rmax). Preferably, the average roughness (Ra) is equal to or less than 0.5 and the maximum roughness (Rmax) is equal to or less than 5 so that the flowing resistance thereof when it is used as a conveying hose for powder or fluid may be suppressed to a low level.

The ultra-high molecular weight polyethylene thin-wall pipe has a coefficient of shrinkage in a diametrical direction which is 5% or lower at 100° C., and when it is used in an environment of a high temperature, or when the dimension of the inner diameter is very significant on an application and a function of the pipe, the coefficient of shrinkage of the pipe in a diametrical direction at 100° C. is preferably from 0 to 3%.

The ultra-high molecular weight polyethylene thin-wall pipe can be manufactured in accordance with such a process that the ultra-high molecular weight polyethylene is supplied into, molten and kneaded in a screw extruder and then the molten substance of the ultra-high molecular weight polyethylene is continuously extruded from a die connected to a screw of the extruder to form a roughly cylindrical shape, whereafter the roughly cylindrical extruded articles is taken up while diametrically expanding the same by means of a tapered core.

An apparatus for manufacturing the ultra-high molecular weight polyethylene thin-wall pipe basically has the same construction as that of the apparatus shown in FIGS. 2 and 3. In particular, the manufacturing apparatus basically includes a screw extruder, a die mounted on the screw extruder, a tapered core member provided continuously to the die, and a take-up unit The screw extruder is similar to those for an ultra-high molecular weight polyethylene shrink pipe and an ultra-high molecular weight polyethylene film described hereinabove in that it includes, as shown in FIG. 9, a grooved cylinder 65, a screw 66 inserted in the grooved cylinder 65, and a hopper 67 for supplying ultra-high molecular weight polyethylene of raw material.

The inner diameter of the grooved cylinder 65 is selected suitably so that a thin-wall pipe of a desired outer diameter may be obtained. The screw 66 should have a compression ratio of 1 to 2.5, and preferably a compression ratio of 1.3 to 2.0. The effective length (L/D) of the screw 66 normally ranges from 20 to 28 or so. The length of a compressing portion of the screw 66 ranges from 25 to 80% or so of the effective length (L/D). Meanwhile, the screw flight pitch normally ranges from 0.4 to 0 8 or so. The speed of rotation of the screw 66 is normally 10 to 50 rpm or so. Further, the hopper 67 is preferably a two-stage hopper since it facilitates, when raw material in the form of powder is to be handled, back flows of air in the cylinder 65 and can prevent occurrence of a failure in dropping of raw material which arises from a hopper bridge.

A heating barrel 68 is disposed on a circumferential wall of the screw extruder in order to melt ultra-high molecular weight polyethylene supplied into the screw extruder, and a water cooling barrel 69 is disposed in order to regulate the heating temperature by the heating barrel 68. The heating temperature at the screw extruder is adjusted normally to a temperature higher than a melting point of ultra-high molecular weight polyethylene but equal to or lower than 340° C. and preferably to a temperature from 160° to 330° C.

The die 62 mounted on the screw extruder is constituted from an inner die 70 and an outer die 71 in which the inner die 70 is inserted. The inner die 70 is connected to an end 72 of the screw 66 of the screw extruder and is rotated by rotation of the screw 66. Meanwhile, the outer die 71 is mounted at an end 73 of the heating barrel 68 of the screw extruder. The die 62 has an L/D ratio at least 10 and preferably 20 to 50. Further, the inner die 70 is preferably constituted such that, since it is rotated by rotation of the screw 66, it decreases in thickness in a tapering condition from the connecting portion thereof and then has a fixed outer diameter at the other end portion from a mid portion thereof and besides it is coated at a surface thereof with fluorocarbon resin in order to assure a high slipping property thereof with ultra-high molecular weight polyethylene which passed through in the inside thereof. A heating barrel 74 is disposed on an outer circumferential wall of the die 62 for regulating the temperature of molten substance of ultra-high molecular weight polyethylene which moves in the die 62. The heating temperature of the die 62 is normally adjusted to 160° to 250° C. or so.

Figure 10:
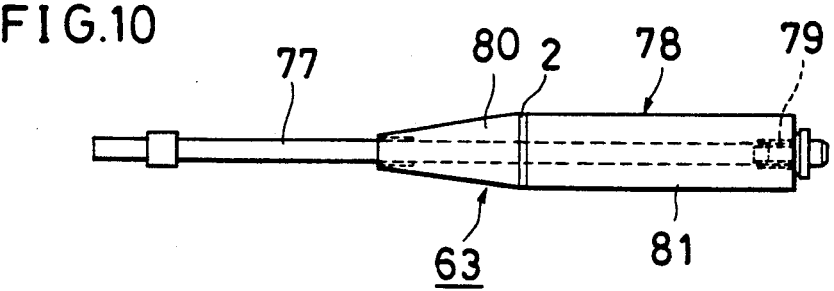
FIG. 10 is a schematic view showing a tapered core of the manufacturing apparatus for an ultra-high molecular weight polyethylene thin pipe of the present invention.

In the manufacturing apparatus, the tapered core member 63 shown in an enlarged view of FIG. 10 is provided continuously to the inner die 70 of the die 62. The tapered core member 63 includes a shaft 77 connected to an end 76 of the inner die 70, and a tapered forming member 78 loosely fitted on the shaft 77. The shaft 77 connected to the end 76 of the inner die 70 is rotated together with the inner die 70 connected to the screw 66. The outer diameter of the shaft 77 is normally smaller than the outer diameter of the inner die 70, and the length of the shaft 77 is normally 10 to 50 cm or so.

Meanwhile, the tapered forming member 78 is loosely fitted on the shaft 77 by means of a bearing 79 and is mounted on the shaft 77 such that it may not rotate together with the shaft 77. The tapered forming member 78 has a tapered portion 80 which is formed in an inclined relationship at an angle normally of 5 to 50 degrees and preferably of 10 to 30 degrees with respect to an axial direction of the shaft 77 so that frictional resistance between the tapered shaping member 78 and an ultra-high molecular weight polyethylene thin-wall pipe upon diametrical expansion may be adjusted to a range within which a shaping operation can be performed readily. The tapered forming member 77 further has a cylindrical portion 81 provided continuously to the tapered portion 80.

The tapered portion 80 of the tapered forming member 78 preferably has convex and concave portions on a surface thereof so that the contact area thereof with a roughly molded form may be reduced to delay cooling and solidifying of the roughly shaped article such that the pipe made of the ultra-high molecular weight polyethylene may be cooled at the cylindrical portion 81 so as to obtain a thin-wall pipe having a low coefficient of thermal shrinkage. Such convex and concave portions formed on the surface of the tapered portion 80 of the tapered forming member 78 may be provided, for example, by forming convex and concave portions in the form of a satin crape finish on the surface or by cutting several grooves in a direction perpendicular to the axis of the tapered portion 80 like annular rings.

Meanwhile, the cylindrical portion 81 of the tapered forming member 78 has a smooth surface Further, in order to prevent that the tapered portion 80 of the tapered forming member 78 is deprived of heat by the cylindrical portion 81 immersed in and cooled by a cooling water tank to drop the temperature thereof so that cooling and solidify of a roughly molded form begins at the tapered portion 80, but to allow cooling cure of the roughly molded form to be delayed so that cooling and solidifying may be begun at the cylindrical portion 81, the tapered portion 80 and the cylindrical portion 81 are connected to each other with a heat insulating material 82 interposed therebetween in order to thermally isolate the tapered portion 80 and the cylindrical portion 81 from each other. The heat insulating material 82 may be, for example, a teflon ® sheet.

A coating of fluorocarbon resin such as teflon ® is preferably applied to surfaces of the tapered portion 80 and the cylindrical portion 81 of the tapered forming member 78 so that the coefficient of friction with an ultra-high molecular weight polyethylene molded form may be reduced to perform molding smoothly.

The ratio in length of the tapered portion 80 to the cylindrical portion 81 of the tapered shaping member 78 in its axial direction is normally set to 0.2 to 1 or so and preferably to 0.3 to 0.7 or so. Further, the maximum outer diameter of the tapered portion 80, that is, the outer diameter of the cylindrical portion 81, should be set at least to 1.2 to 3 times the diameter of the inner die 70 and preferably to 1.5 to 3.0 times and further preferably to 1.7 to 2.5 times the diameter of the inner die 70.

The present manufacturing apparatus includes the take-up unit. The take-up unit includes 2 to 4 pairs, preferably 4 pairs, of rolls disposed serially in a taking up direction of an ultra-high molecular weight polyethylene thin pipe.

In the manufacturing apparatus described above, ultra-high molecular weight polyethylene having an intrinsic viscosity ($\eta$) of 5.0 dl/g or more is first supplied into, molten and kneaded in the screw extruder, and then the molten substance of the ultra-high molecular weight polyethylene is continuously extruded from the die 62 to form a roughly cylindrical shape, whereafter the diameter of the roughly cylindrical extruded article is expanded by the tapered core 63 such that the inner diameter of a maximum diametrically expanded portion of the roughly cylindrical extruded articles may be 1.2 to 3 times and preferably 1.5 to 3 times and further preferably 1.7 to 2.5 times as the diameter of the inner die 70 so that a good film of an appropriate thickness can be obtained.

In this instance, the manufacturing apparatus is adjusted such that a thin-wall pipe to be shaped by the tapered core member 63 may begin to be cooled to cure at the cylindrical portion 81 of the tapered core member 63 so that a pipe having a low coefficient of thermal shrinkage may be obtained. Such adjustment of the cooling and solidifying starting point to the location of the cylindrical portion 81 can be performed by suitably selecting the extruding rate of the die 62, the distance between the tapered portion 80 of the tapered core member 63 and the inner die 70, or the position at which cooling by air or water takes place.

The thus diametrically expanded thin-wall pipe is cooled in the cooling tank and then taken up by the take-up unit. The taking up rate of the take-up unit is adjusted 3 times or lower the extruding rate of the molten substance of the ultra-high molecular weight polyethylene by the screw extruder and preferably 1.1 to 2 times so that a slack does not occur at the roughly extruded article and a shaping operation is easy and besides an ultra-high molecular weight polyethylene thin pipe having a low coefficient of thermal shrinkage in its longitudinal direction may be obtained.

The ultra-high molecular weight polyethylene thin pipe taken up by and formed on the take-up unit can be cut with a required length by a cutter. The cutter may be a popular apparatus such as a shearing cutter employing a round saw or a blade.

Further, the ultra-high molecular weight polyethylene thin pipe of the present invention can be partially cut away and developed into a sheet, which is then cut into belts or tapes elongated in a direction of a flow so that they may be used as base threads for stretchable yarns.

EXAMPLES

In the following, the present invention will be described in detail in connection with examples of the present invention and comparative examples. However, the present invention shall not be restricted by the examples at all unless the spirit and scope of the present invention are exceeded.

EXAMPLE 1

Ultra-high molecular weight polyethylene shrink pipes were manufactured using an apparatus which has the same construction as that of the manufacturing apparatus for a shrink pipe shown in FIG. 2 and wherein specifications of the components are such as follows:

| Extruder: | | |
| --- | --- | --- |
| outer diameter of screw | | 30 mm$\phi$ |
| effective length (L/D) of screw | | 22 |
| flight pitch | | 18 mm |
| compression ratio of screw | | 1.8 |
| Die: | | |
| length of die | | 750 mm |
| inner diameter of outer die at exit of die | | 20 mm$\phi$ |
| effective length (L/D) of die | | 37.5 |
| outer diameter of inner die | | 15 mm$\phi$ |
| Tapered core connected to end of inner die: having tapered portion and cylindrical portion integrally shaped from aluminum metal and coated with teflon ® at surface thereof. | | |
| tapered portion | maximum diameter | 26 mm$\phi$ |
|  | length | 50 mm |
| cylindrical portion | outer diameter | 26 mm$\phi$ |
|  | length | 80 mm |

The apparatus further includes an air ring for cooling a roughly molded form of resin, a cooling water tank, a take-up unit of the roll type and a pipe cutting machine.

Powder resin of ultra-high molecular weight polyethylene ($\eta$): 15.1 dl/g, melting point: 136° C., bulk specific gravity: 0.43 g/cc) (Mitsui Petrochemical Industries, Ltd., HIZEX MILLION 240M) was supplied into the apparatus, and the temperatures at the water cooling barrel ($C_1$) and the heating barrel which was divided into three zones ($C_2$, $C_3$ and $C_4$) were adjusted to 20° C., 290° C., 330° C. and 330° C., respectively. Further, the temperatures of the die which was divided into three zones ($D_1$, $D_2$ and $D_3$) were adjusted to 230° C., 180° C. and 170° C., respectively. In this condition, the ultra-high molecular weight polyethylene was extrusion molded into a roughly molded form at the number of revolution of the screw of 12 rpm and at the extruding rate of 18 cm/min. At the exit of the die, the roughly cylindrical extruded article was cut in the extruding direction by a knife and passed through the cooling water tank. Then, the extruded article was introduced into the take-up unit of the roll type including rolls rotating at the speed of 30 cm/min. After then, the cutting operation by means of the knife was stopped, and the diameter of the extruded article was expanded by the tapered portion of the tapered core, and cooling air was blown from the air ring to the extruded article. The amount of the cooling air was adjusted so that cooling cure of the extruded article might start at an intermediate portion of the tapered portion. Thus, shrink pipes made of the ultra-high molecular weight polyethylene wherein the outer diameter is 27.0 mm$\phi$ while the inner diameter is 25.5 mm$\phi$ and the expansion ratio (inner diameter ratio) is 1.7 were manufactured.

Coefficients of thermal shrinkage of the ultra-high molecular weight polyethylene shrinkage pipes were measured by the following method. Results are shown in Table 1.

Measurement of Coefficient of Thermal Shrinkage

Every specimen was heated for one hour at 140° C. in an air oven, and after lapse of 24 hours at 23° C. a coefficient of shrinkage of an inner diameter in a diametrical direction was measured and decided as an index to a coefficient of thermal contraction.

coefficient of thermal shrinkage (%) = {(dimension before heating − dimension after heating)/dimension before heating} × 100

EXAMPLE 2

Ultra-high molecular weight shrink contraction pipes having an outer diameter of 44.9 mm$\phi$ and an inner diameter of 44 mm$\phi$ were manufactured in the same conditions as those in the Example 1 except that another tapered core having an outer diameter of 45 mm$\phi$ (expansion ratio of 3) was used, and coefficients of thermal shrinkage of them were measured. Results are shown in Table 1.

Comparative Example 1

Pipes made of ultra-high molecular weight polyethylene having an outer diameter of 17.7 mm$\phi$ and an inner diameter of 14.0 mm$\phi$ (expansion ratio: 0.93) were manufactured in the same conditions as those in the Example 1 except that no tapered core was used and the taking up rate was set differently to 20 cm/min, and coefficients of thermal shrinkage of them were measured. Results are listed in Table 1.

Comparative Example 2

Molding of shrink pipes was attempted in the same conditions as those in the Example 1 except that polyethylene powder resin having an intrinsic viscosity ($\eta$) of 3.5 dl/g, a density of 0.950 g/cc and a bulk specific gravity of 0.38 g/cc (Mitsui Petrochemical Industries, Ltd., HIZEX 8000FP) was used and the heating temperatures at the zones $C_1$, $C_2$, $C_3$ and $C_4$ of the extruder were adjusted to 20° C., 210° C., 230° C. and 230° C., respectively. However, since the resin was turned together with rotation of the inner die, it was difficult to manufacture roughly shaped articles, and consequently, no shrink pipes were manufactured.

TABLE 1

|  | Example 1 | Example 2 | Comparative Example 1 | Comparative Example 2 |
| --- | --- | --- | --- | --- |
| Outer Diameter (D) (mm) | 27.0 | 44.9 | 17.7 | Shaping Impossible |
| Inner Diameter (D) (mm) | 25.5 | 44.0 | 14.0 |  |
| Thickness (t) (mm) | 0.75 | 0.45 | 1.85 |  |
| (D)/(t) | 36.0 | 99.8 | 9.6 |  |
| Expansion Ratio (Inner Dia.) (times) | 1.7 | 2.9 | 0.93 |  |
| Coefficient of Thermal Shrinkage (%) | 30 | 91 | 3.6 |  |

EXAMPLE 3

Ultra-high molecular weight polyethylene films were manufactured using a manufacturing apparatus for an ultra-high molecular weight polyethylene film which has such structure as shown in FIG. 5 and includes a screw extruder wherein various portions have the following specifications:

| | |
| --- | --- |
| outer diameter of screw | 30 mm$\phi$ |
| effective length (L/D) of screw | 22 |
| flight pitch | 18 mm (fixed) |
| compression ratio of screw | 1.8 | a die wherein various portions have the following specifications:

| | |
| --- | --- |
| length of pipe die | 750 mm |
| inner diameter of outer die at exit of die | 20 mm$\phi$ |
| effective length (L/D) of die | 37.5 |
| outer diameter of inner die | 15 mm$\phi$ | a tapered core including a tapered portion connected to an end of the inner die and having an increasing diameter at an angle of 15/100 (11.7 degrees) with respect to a shaft and further having a maximum outer diameter of 60 mm$\phi$ and a length of 110 mm, and a cylindrical portion having an outer diameter of 60 mm$\phi$ and a length of 200 mm and having a fluorocarbon resin coating applied to a surface thereof, a cooling water tank, a take-up unit of the roll type including four pairs of rubber rolls having an outer diameter of 150 mm$\phi$ and a width of 65 mm, and a take-up unit.

Ultra high molecular weight polyethylene in the form of powder having an intrinsic viscosity ($\eta$) of 15.4 dl/g, a melting point of 136° C. and a bulk specific gravity of 0.43 g/cc was supplied into the manufacturing apparatus, and the preset temperatures at a water cooling barrel ($C_1$) and the heating barrel which was divided into three zones ($C_2$, $C_3$ and $C_4$) were adjusted to 20° C., 290° C., 335° C. and 335° C., respectively. Further, the preset temperatures at three zones ($D_1$, $D_2$ and $D_3$) of the die were adjusted to 230° C., 180° C. and 168° C., respectively. In this condition, the ultra-high molecular weight polyethylene was extrusion molded, while being molten and kneaded, into a roughly cylindrical extruded article at the number of revolution of the screw of 10 rpm and at the extruding rate of 15 cm/min. The roughly cylindrical extruded article was cut by a knife located at the exit of the die and passed through the cooling water tank. Then, the roughly extruded article was introduced into the take-up unit in which the 4 pairs of rubber rolls were rotating at the speed of 20 cm/min. After then, the cutting operation of the extruded article was stopped, and the diameter of the extruded article was expanded into the profile of a pipe by the tapered portion of the tapered core. Subsequently, the thus diametrically expanded extruded article was advanced, at a portion thereof of a length of 200 mm from an end of the cylindrical portion thereof, into the cooling water tank so that the extruded article in the profile of a pipe may be cooled to cure at the cylindrical portion of the tapered core. The taking up rate of the take-up unit was adjusted to 2 m/min. Consequently, ultra-high molecular weight polyethylene films having a thickness of 55 μm and free from a folded mark at both ear edges thereof were obtained.

The ultra-high molecular weight polyethylene films were applied to a tensile test and coefficients of thermal shrinkage were measured in accordance with the following method. Results are listed in Table 2.

Tensile Test

A tensile strength at breaking point (TS: kg/cm$^2$) and an elongation (EL: %) of specimen were measured for both of a longitudinal direction (MD) and a transverse direction (TD) in the following testing conditions:

| | |
|---|---|
| shape of specimen | JIS K6781 |
| chucking distance | 86 mm |
| stretching speed | 200 mm/min |
| temperature | 23° C. |

Coefficient of Thermal Shrinkage

Specimen was heated for one hour at 130° C. in an air oven, and after lapse of 24 hours at 23° C., coefficients of thermal shrinkage both in a longitudinal direction (MD) and a transverse direction (TD) were measured in accordance with the following expression:

coefficient of thermal shrinkage (%) = {(dimension before heating − dimension after heating)/dimension before heating} × 100

EXAMPLE 4

Ultra-high molecular weight polyethylene films having a thickness of 58 μm and free from a folded mark at both ear edges thereof were manufactured in the same conditions as those in the Example 3 except that a further tapered core having a tapered portion having a maximum outer diameter of 75 mmφ and a take-up unit including rolls having a width of 90 mm were used and the taking up rate of the take-up unit was set to 1.5 mm/min, and a tensile test was conducted for them and coefficients of thermal shrinkage of them were measured. Results are shown in Table 2.

Comparative Example 3

Ultra-high molecular weight polyethylene films having a thickness of 40 μm and free from a folded mark at both ear edges thereof were manufactured in the same conditions as those in the Example 3 except that a different tapered core having a tapered portion having a maximum outer diameter of 40 mmφ and a different take-up unit including rolls having a width of 50 mm were used and the taking up rate of the take-up unit was set to 4 m/min, and a tensile test was conducted for them and coefficients of thermal shrinkage of them were measured. Results are shown in Table 2.

Comparative Example 4

Manufacture of polyethylene films was attempted in the same conditions as those in the Example 3 except that, in place of ultra-high molecular weight polyethylene, powder of general purpose polyethylene resin having an intrinsic viscosity (η) of 3.5 dl/g, a density of 0.950 g/cc and a bulk specific gravity of 0.38 g/cc (Mitsui Petrochemical Industries, Ltd., HIZEX 8000FP) was used and the heating temperatures at the water cooling barrel ($C_1$) and three zones ($C_2$, $C_3$ and $C_4$) of the heating barrel of the extruder were adjusted to 20° C., 210° C., 230° C. and 230° C., respectively. However, since a roughly molded form in the form of a pipe was turned together with rotation of the inner die due to a low melt viscosity of the resin, no films were manufactured. Results are shown in Table 2.

Comparative Example 5

Ultra-high molecular weight polyethylene films were manufactured in the same conditions as those in the Example 3 except that a take-up unit including rolls having a width of 100 mm was used, and a tensile test was conducted for them and coefficients of thermal shrinkage of them were measured. Results are shown in Table 2.

Comparative Example 6

Manufacture of ultra-high molecular weight polyethylene films was attempted in the same conditions as those in the Example 3 except that a take-up unit including rolls having a width of 45 mm was used. However, the taking up force was not able to stand frictional resistance upon diametrical expansion of a roughly molded form by the tapered core, and consequently, no films were manufactured.

TABLE 2

| Evaluation Items | Unit | Example 3 | Example 4 | Comparative Example 3 | Comparative Example 4 | Comparative Example 5 | Comparative Example 6 |
|---|---|---|---|---|---|---|---|
| (η) of Raw Material | dl/g | 15.4 | 15.4 | 15.4 | 3.5 | 15.4 | 15.4 |
| Core Maximum Dia./Inner Die Dia | | 4 | 5 | 2.7 | 4 | 4 | 4 |
| Taking Up Rate/ Roughly Shaped Article Speed | | 13 | 10 | 27 | 13 | 13 | 13 |
| Roll Width | | 65 | 90 | 50 | 65 | 100 | 45 |
| Evaluation of Shapeability | — | Good | Good | Good | Shaping Impossible | Folded Marks on Both Ears | Take-off Incomplete |
| TS | | | | | | | |

TABLE 2-continued

| Evaluation Items | Unit | Example 3 | Example 4 | Comparative Example 3 | Comparative Example 4 | Comparative Example 5 | Comparative Example 6 |
|---|---|---|---|---|---|---|---|
| MD | | 1250 | 1100 | 1860 | — | 1300 | — |
| TD | | 1070 | 1550 | 920 | | 1040 | |
| EL | | | | | | | |
| MD | | 160 | 110 | 30 | — | 90 | — |
| TD | | 100 | 80 | 220 | | 150 | |
| Coefficient of Thermal Shrinkage | | | | | | | |
| MD | | 37 | 14 | 55 | — | 35 | — |
| TD | | 28 | 31 | 6 | | 29 | |

EXAMPLE 5

Ultra-high molecular weight polyethylene thin-wall pipes were manufactured using an apparatus which has the same construction as that of the manufacturing apparatus for a thin pipe shown in FIGS. 2 and 9 and wherein specifications of the components are such as follows:

| Extruder: | | |
|---|---|---|
| outer diameter of screw | 30 | mm0 |
| effective length (L/D) of screw | 22 | |
| flight pitch | 18 | mm |
| compression ratio of screw | 1.8 | |
| Die: | | |
| length of die | 750 | mm |
| inner diameter of outer die at exit of die | 20 | mm0 |
| effective length (L/D) of die | 37.5 | |
| outer diameter of inner die | 15 | mm0 |

Tapered core shown in FIG. 10, connected to end of inner die: having tapered portion diametrically expanding at angle of 14/100 (8 degrees) with respect to shaft and coated with TEFLON ® at surface thereof. TEFLON ® sheet of 1 mm thick is held between tapered portion and cylindrical portion as heat insulating material.

| tapered portion | maximum diameter | 26 | mm$\phi$ |
|---|---|---|---|
| | length | 50 | mm |
| cylindrical portion | outer diameter | 26 | mm$\phi$ |
| | length | 150 | mm |

The apparatus further include a cooling water tank, a take-up unit of the roll type and a pipe cutting machine.

Powder resin of ultra-high molecular weight polyethylene ($\eta$): 15.4 dl/g, melting point: 136° C., bulk specific gravity: 0.43 g/cc) (Mitsui Petrochemical Industries, Ltd., HIZEX MILLION 240M) was supplied into the apparatus, and the temperatures at the water cooling barrel ($C_1$) and the heating barrel which was divided into three zones ($C_2$, $C_3$ and $C_4$) were adjusted to 20° C., 290° C., 330° C. and 330° C., respectively. Further, the temperatures of the die which was divided into three zones ($D_1$, $D_2$ and $D_3$) were adjusted to 230° C., 180° C. and 170° C., respectively.

In this condition, the ultra-high molecular weight polyethylene was extrusion molded into a extruded article at the number of revolution of the screw of 20 rpm and at the extruding rate of 30 cm/min. At the exit of the die, the cylindrical extruded article was cut in the extruding direction by a knife and passed through the cooling water tank. Then, the roughly molded form was introduced into the take-up unit of the roll type including rolls rotating at the speed of 40 cm/min. After then, the cutting operation by means of the knife was stopped, and the diameter of the extruded article was expanded by the tapered portion of the tapered core. Subsequently, the thus diametrically expanded extruded article was advanced, at a portion thereof of a length of 100 mm from an end of the cylindrical portion thereof, into the cooling water tank. Thus, ultra-high molecular weight polyethylene thin-wall pipes having an outer diameter of 27.8 mm$\phi$ and an inner diameter of 25.6 mm$\phi$ were obtained.

Coefficients of thermal shrinkage and surface roughnesses of the ultra-high molecular weight polyethylene thin-wall pipes were measured in accordance with the following method. Results are shown in Table 3.

Measurement of Coefficient of Thermal Shrinkage

Every specimen was heated for one hour at 100° C. in an air oven, and a coefficient of shrinkage of an inner diameter in a diametrical direction after lapse of 24 hours at 23° C. was measured and decided as an index to a coefficient of thermal shrinkage.

coefficient of thermal shrinkage (%)={(dimension before heating−dimension after heating)/dimension before heating}×100

Surface Roughness

Surface roughnesses of inner and outer diameters of every thin-wall pipe were measured in conformity to JIS B0601.
Ra: center line average roughness ($\mu$m)
Rmax: maximum roughness ($\mu$m)

EXAMPLE 6

Ultra-high molecular weight polyethylene thin-wall pipes having an outer diameter of 45.7 mm$\phi$ and an inner diameter of 44.5 mm$\phi$ were manufactured in the same conditions as those in the Example 5 except that a tapered core having an outer diameter of 45 mm$\phi$ was used, and coefficients of thermal shrinkage and surface roughnesses of them were measured. Results are shown in Table 3.

EXAMPLE 7

Thin-wall pipes made of ultra-high molecular weight polyethylene and having an outer diameter of 45.5 mm$\phi$ and an inner diameter of 44.2 mm$\phi$ were manufactured in the same conditions as those in the Example 5 except that a tapered core having an outer diameter of 45 mm$\phi$ was used and a extruded article was advanced, at a portion thereof of a length of 120 mm from an end of the cylindrical portion of the tapered core, into the cooling water tank so that the cooling cure point of the roughly shaped article might be at the tapered portion, and coefficients of thermal shrinkage and surface roughnesses of them were measured. Results are shown in Table 3.

Comparative Example 7

Pipes made of ultra-high molecular weight polyethylene and having an outer diameter of 18.1 mm$\phi$ and an inner diameter of 14.3 mm$\phi$ were manufactured in the same conditions as those in the Example 5 except that no tapered core was used and the taking up rate was set differently to 35 cm/min, and coefficients of thermal shrinkage and surface roughnesses of them were measured. Results are shown in Table 3.

Comparative Example 8

Molding of thin-wall pipes was attempted in the same conditions as those in the Example 5 except that polyethylene powder resin having an intrinsic viscosity ($\eta$) of 3.5 dl/g, a density of 0.950 g/cc and a bulk specific gravity of 0.38 g/cc (Mitsui Petrochemical Industries, Ltd., HIZEX 8000FP) was used as raw material and the heating temperatures at the zones $C_1$, $C_2$, $C_3$ and $C_4$ of the extruder were adjusted to 20 °C., 210° C., 230° C. and 230° C., respectively. However, since the molten resin was turned together with rotation of the inner die, it was difficult to manufacture roughly shaped articles, and consequently, no shrink pipes were manufactured Results are shown in Table 3.

TABLE 3

| Evaluation Items | Examples | | | Comparative Examples | |
|---|---|---|---|---|---|
| | 5 | 6 | 8 | 7 | 8 |
| ($\eta$) of Raw Material Ultra-high molecular weight Polyethylene (dl/g) | 15.4 | 15.4 | 15.4 | 15.4 | 3.5 |
| Outer Diameter (D) (mm) | 27.8 | 45.7 | 45.5 | 18.1 | Shaping Impossible |
| Inner Diameter (mm) | 25.6 | 44.5 | 44.2 | 14.3 | |
| Thickness (t) (mm) | 1.1 | 0.6 | 0.65 | 1.9 | |
| D/t | 25 | 76 | 70 | 10 | |
| Expansion Ratio (Inner Dia.) (times) | 1.7 | 3.0 | 2.9 | 0.95 | |
| Coefficient of Thermal Shrinkage (Inner Dia.) (%) | 0.2 | 2.8 | 8.2 | −0.1 | |
| Surface Roughness ($\mu$m) | | | | | |
| Average Roughness (Ra) | | | | | |
| Inner Surface | 0.26 | 0.23 | 0.41 | 1.33 | |
| Outer Surface | 1.47 | 1.72 | 2.55 | 1.58 | |
| Maximum Roughness (Rmax) | | | | | |
| Inner Surface | 2.0 | 1.6 | 2.4 | 8.3 | |
| Outer Surface | 9.3 | 10.8 | 15.2 | 9.1 | |

Since an ultra-high molecular weight polyethylene thin-wall pipe of the present invention is uniform in thickness and free from a folded mark, when a roll, a pipe, a steel tube or the like is coated with this thin-wall pipe, a coating with a high degree of accuracy can be obtained.

Further, a method of and an apparatus for manufacturing can manufacture the thin-wall pipe as described above at a high efficiency and have a large merit in industrial practice.

An ultra-high molecular weight polyethylene shrink pipe of the present invention is thick and allows finish working thereof by means of a lathe or the like and besides is low in coefficient of shrinkage in a longitudinal direction, comparing with a shrink pipe obtained by a conventional blown film extrusion method. Accordingly, the coating efficiency is high and an coating can be obtained economically. Further, since ultra-high molecular weight polyethylene is superior in abrasion resistance, self-lubrication and chemical resistance, and particularly superior in abrasion resistance to fluorocarbon resins, the ultra-high molecular weight polyethylene shrink pipe of the present invention is superior in durability. Consequently, the ultra-high molecular weight polyethylene shrink pipe of the present invention can be applied suitably as a shrink pipe for covering for various rolls, pipes, steel tubes and so forth.

Further, a manufacturing method for an ultra-high molecular weight polyethylene shrink pipe of the present invention can manufacture the ultra-high molecular weight polyethylene shrink pipe described above efficiently.

Further, a manufacturing apparatus for an ultra-high molecular weight polyethylene shrink pipe of the present invention can be used suitably for the manufacturing method for an ultra-high molecular weight polyethylene shrink pipe described above.

According to a manufacturing method for an ultra-high molecular weight polyethylene film of the present invention, an ultra-high molecular weight polyethylene film can be obtained which is suitable for an application for which a high degree of accuracy in dimension is required, because it is uniform in thickness and free from a folded mark at both ear edges thereof comparing with a film obtained by a conventional blown film extrusion method. Particularly, since ultra high molecular weight polyethylene is superior in abrasion resistance, self-lubrication and chemical resistance and particularly superior in abrasion resistance to fluorocarbon resins, the ultra-high molecular weight polyethylene film of the present invention is superior in durability. Consequently, the ultra-high molecular weight polyethylene film of the present invention can be applied suitably as a film for covering for various rolls, pipes, steel tubes and so forth.

Further, a manufacturing apparatus for an ultra-high molecular weight polyethylene film of the present invention can be used suitably for the manufacturing method for an ultra-high molecular weight polyethylene film described above.

An ultra-high molecular weight polyethylene thin-wall pipe of the present invention has a ratio of an outer diameter to a thickness of 10 or more and is low in thermal shrinkage comparing with a conventional thin-wall pipe. The ultra-high molecular weight polyethylene thin pipe is useful for a conveying pipe for powder making use of the abrasion resistance, self-lubrication and chemical resistance ultra-high molecular weight polyethylene has, and can also be used suitably as a tubular cover for a roll, a pipe or a steel tube, or as a guide rail cover for a transport line or the like.

Further, a manufacturing method for an ultra-high molecular weight polyethylene thin pipe of the present invention can manufacture the ultra-high molecular weight polyethylene thin pipe at a high efficiency.

Further, a manufacturing apparatus for an ultra-high molecular weight polyethylene thin pipe of the present invention can be used suitably for the manufacturing method for an ultra-high molecular weight polyethylene thin pipe described above.

What is claimed is:

1. A method of manufacturing an ultra-high molecular weight polyethylene thin-wall pipe, comprising the steps of:

supplying ultra-high molecular weight polyethylene having an intrinsic viscosity ($\eta$) of 5.0 dl/g or more into a screw extruder, and melting and kneading the ultra-high molecular weight polyethylene;

continuously extruding the molten substance of the ultra-high molecular weight polyethylene from a die having an L/D ratio at least 10, which includes an outer die, and an inner die connected to and rotated together with a screw of said screw extruder and disposed therein, to form a cylindrical extruder article; and diametrically expanding the cylindrical extruded article by means of a tapered core connected to said inner ride through a shaft and not to rotate with a shaft rotating together with the inner die, which includes a tapered portion and a cylindrical portion provided continuously to said tapered portion, and causing the ultra-high molecular weight polyethylene to start to be cooled to solidify at the tapered portion or the cylindrical portion of the tapered core.

2. A method of manufacturing an ultra-high molecular weight polyethylene shrink pipe, comprising the steps of:

supplying ultra-high molecular weight polyethylene having an intrinsic viscosity ($\eta$) of 5.0 dl/g or more into a screw extruder, and melting and kneading the ultra-high molecular weight polyethylene;

continuously extruding the molten substance of the ultra-high molecular weight polyethylene from a die having an L/D ratio at last 10, which includes an outer die connected to and rotated together with a screw of said screw extruder and disposed therein, to form a cylindrical extruded article;

diametrically expanding the cylindrical extruded article such that the inner diameter of a maximum diametrically expanding portion may be 1.2 to 3.0 times the outer diameter of said inner die, by means of a tapered core connected to said inner die through a shaft and not rotated with a shaft rotating together with the inner die, which includes a tapered portion and a cylindrical portion provided continuously to said tapered portion;

taking up the extruded article at a taking up rate lower than five times the extruding rate at said screw extruder, and causing the ultra-high molecular polyethylene to start to be cooled to solidify at the tapered portion or the cylindrical portion of said tapered core.

3. A method of manufacturing an ultra-high molecular weight polyethylene film, comprising the steps of:

supplying ultra-high molecular weight polyethylene having an intrinsic viscosity ($\eta$) of 5.0 dl/g or more into a screw extruder, and melting and kneading the ultra-high molecular weight polyethylene;

continuously extruding the molten substance of the ultra-high molecular weight polyethylene from a die having a L/D ratio of at least 10, which includes an outer die, and an inner die connected to and rotated together with a screw of said screw extruder and disposed in the inside of the outer die, to form a cylindrical extruded article;

diametrically expanding the cylindrical extruded article such that the inner diameter of a maximum diametrically expanding portion may be 3 times or more than the outer diameter of said inner die, by means of a tapered core connected to said inner die through a shaft and not rotated with a shaft rotating together with the inner die, which includes a tapered portion and a cylindrical portion provided continuously to said tapered portion;

taking up the extruded article at a taking up rate three times or higher than the extruding rate at said screw extruder; and causing the ultra-high molecular weight polyethylene to start to be cooled to solidify at the tapered portion or the cylindrical portion of the tapered core.

4. A method of manufacturing an ultra-high molecular weight polyethylene shrink pipe, comprising the steps of:

supplying ultra-high molecular weight polyethylene having an intrinsic viscosity ($\eta$) of 5.0 dl/g or more into a screw extruder, and melting and kneading the ultra-high molecular weight polyethylene;

continuously extruding the molten substance of the ultra-high molecular weight polyethylene from a die having a L/D ratio of at least 10, which includes an outer die, and an inner die connected to and rotated together with a screw of said screw extruder and disposed in the inside of the outer die, to form a cylindrical extruded article;

diametrically expanding the cylindrical extruded article such that the outer diameter of a maximum diametrically expanding portion may be 1.2 to 3.0 times the outer diameter of said inner die, by means of a tapered core connected to said inner die through a shaft and not rotated with a shaft rotating together with the inner die, which includes a tapered portion and a cylindrical portion provided continuously to said tapered portion;

taking up the extruded article at a taking up rate lower than five times the extruding rate at said screw extruder, and causing the ultra-high molecular weight polyethylene to start to be cooled to solidify at said cylindrical portion of the tapered core.

* * * * *